United States Patent
Mizoguchi et al.

(10) Patent No.: US 6,658,063 B1
(45) Date of Patent: Dec. 2, 2003

(54) OFDM PACKET COMMUNICATION RECEIVER SYSTEM

(75) Inventors: Masato Mizoguchi, Kanagawa (JP); Takeshi Onizawa, Kanagawa (JP); Tomoaki Kumagai, Kanagawa (JP); Masahiro Morikura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 604 days.

(21) Appl. No.: 09/617,750

(22) Filed: Jul. 17, 2000

(30) Foreign Application Priority Data

Jul. 19, 1999 (JP) .......................................... 11-204650
Jul. 19, 1999 (JP) .......................................... 11-204657
Aug. 25, 1999 (JP) .......................................... 11-238647

(51) Int. Cl.[7] ................................................ H04K 1/10
(52) U.S. Cl. ...................................... 375/260; 375/355
(58) Field of Search ................................. 375/260, 354, 375/355, 362, 364, 365, 366, 343; 370/509, 510, 511, 512, 513, 514

(56) References Cited

U.S. PATENT DOCUMENTS

| | | | |
|---|---|---|---|
| 5,363,412 A | * 11/1994 | Love et al. .................. | 375/341 |
| 5,717,722 A | 2/1998 | Mori | |
| 5,910,948 A | * 6/1999 | Shou et al. .................. | 370/335 |
| 6,314,129 B1 | * 11/2001 | Sunwoo et al. ............. | 375/149 |
| 6,356,598 B1 | * 3/2002 | Wang ......................... | 375/321 |

FOREIGN PATENT DOCUMENTS

| | | |
|---|---|---|
| EP | 0 645 917 A2 | 3/1995 |
| EP | 0 901 256 A1 | 3/1999 |
| EP | 0 915 597 A1 | 5/1999 |
| GB | 2 325 125 A | 11/1998 |
| JP | 9-23221 | 1/1997 |
| JP | 10-294711 | 11/1998 |
| WO | WO 00/77961 A1 | 12/2000 |

OTHER PUBLICATIONS

Mizoguchi et al., "A Fast Burst Synchronization Scheme for OFDM" –IEEE, New York, vol. 1, 1988, pp. 125–129, XP002121851.

* cited by examiner

Primary Examiner—Don N. Vo
(74) Attorney, Agent, or Firm—Armstrong, Kratz, Quintos, Hanson & Brooks, LLP

(57) ABSTRACT

A preamble for synchronization, or a reference timing for operation of an OFDM packet communication receiver system is detected finely even under environment of large waveform distortion due to thermal noise and/or multi-path propagation, and/or large carrier frequency offset between a transmit side and a receiver side. A correlator (1) detects a pattern of a short preamble (t1–t10) in a preamble for synchronization. An output of the correlator (1) is applied to a complex filter (7) which separates a short preamble having a predetermined repetition period from uniformly distributed noise. A scalar filter (9) integrates some period of short preambles which have distributed-delay by multi-path propagation as if a single short preamble with no delay were received for determining a reference timing. When a correlator output exceeds a predetermined threshold level a plurality of times for every repetition periods (T) of a short preamble, and an output of the correlator after time (T) from the last short preamble is decreased a predetermined ratio as compared with that of the last short preamble, it is determined that a preamble for synchronization is detected. Carrier frequency offset compensation is carried out either for each short preamble during reception of a short preamble, or based upon the last received short preamble during reception of an OFDM symbol after the last short preamble. As a preamble for synchronization is detected accurately, a guard interval of each OFDM symbol is removed accurately, or an FFT window is defined accurately, so that a demodulation is possible in spite of noise and/or interference.

11 Claims, 9 Drawing Sheets

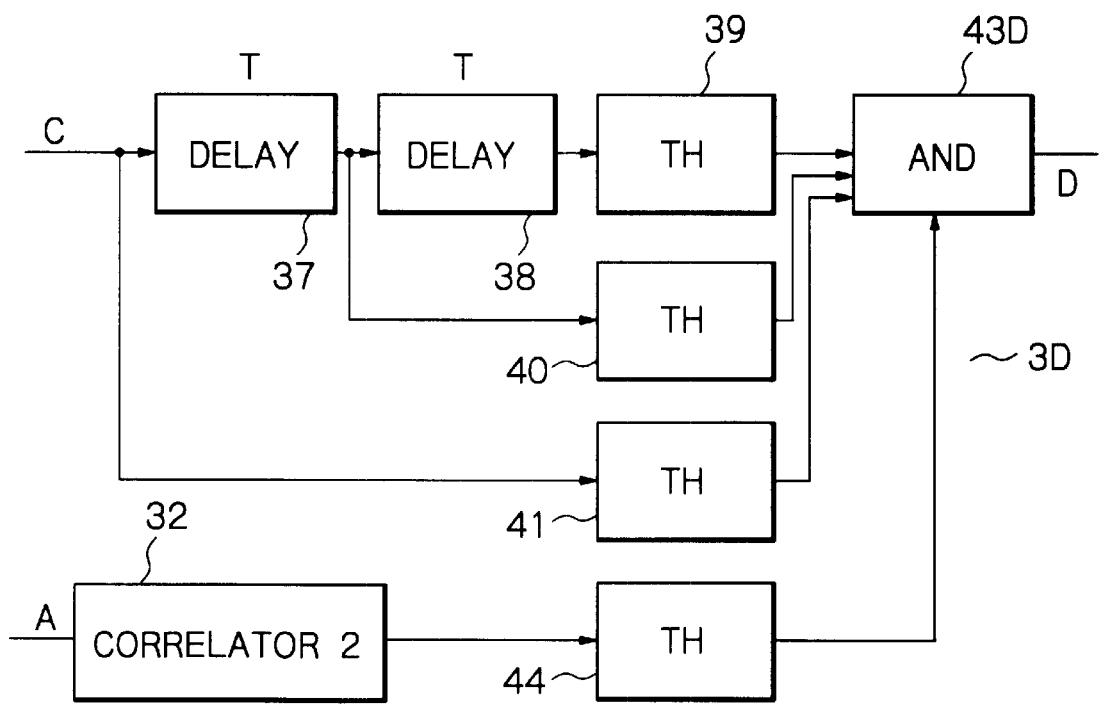

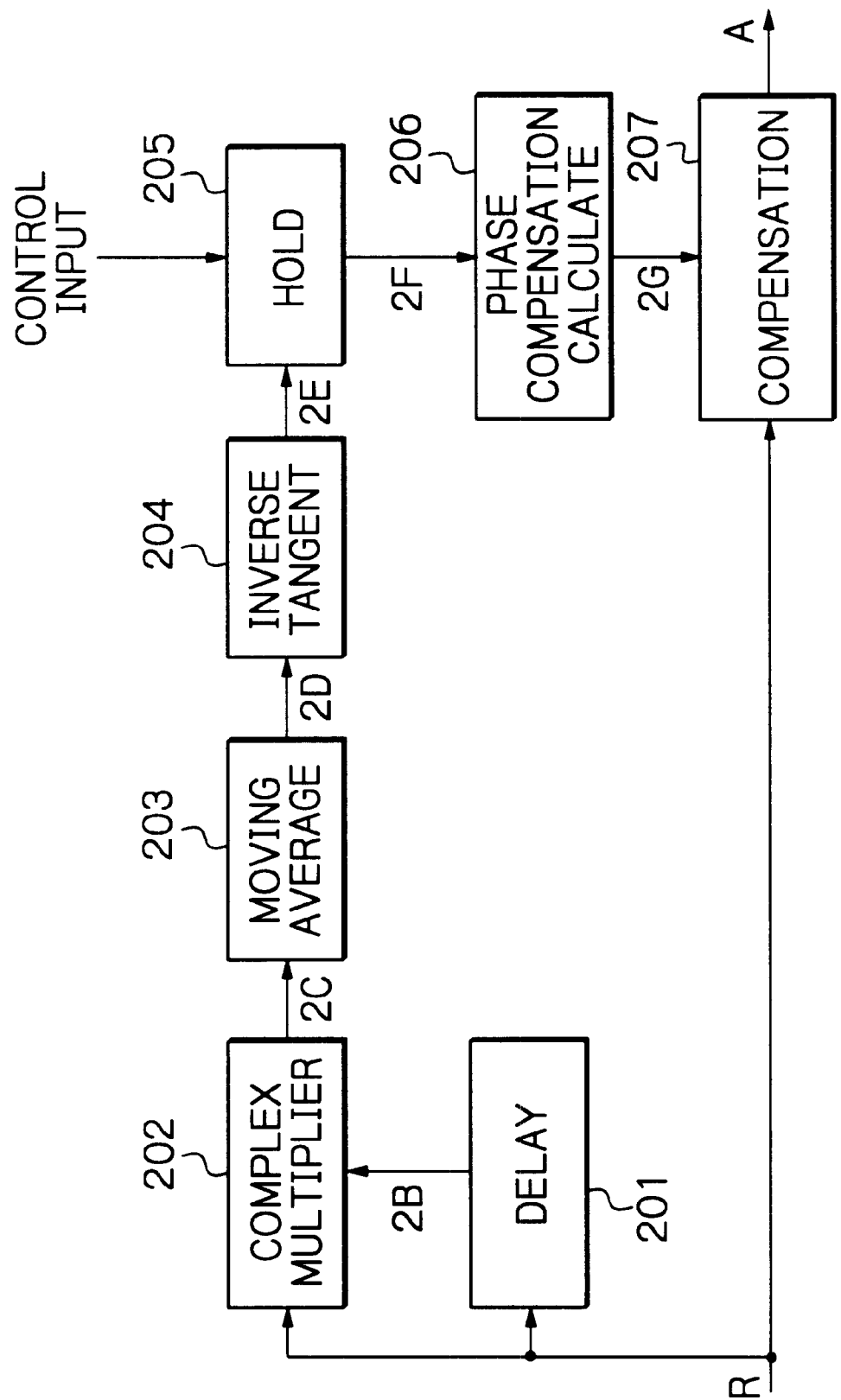

OFDM PACKET COMMUNICATION RECEIVER SYSTEM

BACKGROUND OF THE INVENTION

The present invention relates to a radio packet communication receiver system using orthogonal multi-carrier modulation system, in particular, relates to such a receiver system which detects reference received timing accurately under severe environment of large carrier frequency offset between a transmit side and a receiver side, and/or multi-path propagation, and/or presence of thermal noise.

An orthogonal multi-carrier modulation system transmits high rate signal by using a plurality of sub-carriers each satisfying orthogonal relation, and called OFDM (Orthogonal Frequency Division Multiplexing) system. An OFDM signal can be modulated or demodulated by using (Inverse) Fast Fourier Transform ((I)FFT) circuit. An OFDM system has a feature that an inter-symbol interference is avoided if multi-path delay is within a guard interval, which is added to each OFDM signal so that it carries an OFDM signal cyclically. Therefore, an OFDM system is excellent to combat multi-path environment in high rate transmission.

Because of the excellent multi-path immunity, a radio computer network communication (radio LAN) is expected to use an OFDM system. In a computer network communication, data length is not fixed, and a packet signal in which received timing is indefinite is used. In radio transmission of such a packet signal, burst reception process is essential for independent synchronization of each received packet, including determination of reference timing of a received symbol.

A technical standard IEEE802.11a is one of the radio LAN's using OFDM modulation system. That technical standard can satisfy high rate transmission higher than 20 Mbit/sec.

FIG. 11A shows a packet format which uses an OFDM modulation scheme, having a preamble for synchronization, a preamble for channel estimation, and a plurality of OFDM signals OFDM1, OFDM2, OFDM3 , , , . An preamble for channel estimation, and each OFDM signals comprises a data following a guard interval (GI2, GI). A guard interval has a repetition of waveform at the end of the following OFDM data cyclically. A preamble for synchronization comprises a plurality of repetitive known data patterns called a short interval (in the embodiment, 10 short intervals t1 through t10 are provided). A preamble for channel estimation comprises known data patterns T1 and T2 following a guard interval GI2, for demodulating sub-carriers (channel demodulation for coherent detection). Each OFDM signal is used for carrying transmission data. At least one of the OFDM signals (for instance OFDM1) is used for showing a property (modulation scheme, transmission rate, length of a packet et al) of succeeding OFDM signals.

A preamble for synchronization (t1 through t10) is used for synchronizing receiver carrier frequency with transmitter carrier frequency, and defining a reference timing of a receiver.

The present invention provides accurately a reference timing of a preamble for synchronization. The reference timing is at a rear end of the short timing t10. By using the accurate reference timing of the preamble for synchronization, a carrier frequency of a receiver is synchronized with a carrier frequency of a transmitter, a guard interval is removed from each OFDM signal for Fourier transformation, and coherent detection of each OFDM signal is carried out for demodulating each sub-carriers.

FIG. 11B shows a block diagram of a prior art of an OFDM packet communication receiver. A received signal R is a radio packet signal shown in FIG. 11A. A received signal R is applied to a correlator 301 which has coefficient of a known pattern (short preamble) of a preamble for synchronization, so that the correlator 301 provides a high level of correlation output signal B when the known pattern (short preamble) is received.

The correlation output signal B is high and has period of the short preamble when a preamble for synchronization is received, and said signal B is low when other signals are received. The correlation output signal B is applied to a timing decision circuit 303, which recognizes the presence of a preamble for synchronization when the correlation output signal B exceeds a threshold level, and recognizes the end of the preamble for synchronization when the correlation output signal B is decreased lower than another threshold level after repetition period of the preamble for synchronization. Then, a reference timing signal D, or a symbol timing signal D is obtained. As a received signal R and an output of the correlator 301 are complex signal having a real part and an imaginary part, the correlation output signal must be converted to a scalar signal when it is applied to the timing decision circuit 303.

A timing decision circuit 303 in a prior art has a delay circuit 37 having delay time T (T=t1=t2=- - - =t10) coupled with a correlation output signal B, a first threshold circuit 39 coupled with an output of said delay circuit 37, a second threshold circuit 40 coupled with a correlation output signal B, and a logic circuit 43 coupled with an output of two threshold circuits to provide a symbol timing signal D when the first threshold circuit 39 shows that an output of the delay circuit 37 is higher than a first threshold level and the second threshold circuit 40 shows that a signal B is lower than a second threshold level.

Thus, the correlation circuit 301 and the timing decision circuit 303 compose a symbol timing detection block 10A. The symbol timing signal D is applied to a frequency offset compensation circuit 20 and a guard interval remove circuit 4. The frequency offset compensation circuit 20 recognizes repetition signals in a received signal R, or a preamble for synchronization, so that it measures carrier frequency offset between a transmit side and a receiver side by measuring phase rotation between repetition waveforms, and compensates said carrier frequency offset .

An output signal A of the carrier frequency offset compensation circuit 20 is applied to a guard interval removal circuit 4, which removes a guard interval GI or GI2 in an OFDM signal in an output A of the frequency offset compensation circuit 20.

After removal of a guard interval, an OFDM symbol E which has no guard interval is applied to a Fourier transform circuit 5 which provides sub-carrier vectors F of each sub-carriers. The sub-carrier vectors F are applied to a coherent detection circuit 6 for coherent detection of each sub-carriers to provide coherent detected signal G. Further, the signal G is applied to a code decision circuit 22 for deciding a code 0 or 1 to provide a received data G2.

By the way, a received signal in radio communication is subject to thermal noise undesirably generated in a receiver amplifier, and/or undesired interference noise. Further, a propagation path is a combination of multi-paths including a direct path and an indirect path reflected by a wall. An OFDM system can provide a high quality transmission even under a multi-path propagation, because of the presence of a guard interval.

However, in an OFDM system in a radio packet communication, a synchronization including decision of a received symbol timing must be established for each packet independently, and the synchronization must be accurate for enjoying to combat multi-path propagation in an OFDM system. Further, a preamble for synchronization in radio packet signal is preferably as short as possible for high rate transmission, and synchronization process is preferably as quick as possible by using a short preamble signal.

A prior burst OFDM receiver has a correlator for recognizing a preamble, and a timing decision circuit for deciding the presence of a preamble in an output of the correlator. However, an accurate decision of a symbol timing would be difficult or a symbol timing would be erroneously decided under large noise environment, and/or multi-path propagation with many delayed waves.

Further, a decided symbol timing is used for compensating carrier frequency offset in a receiver in a prior art. Accordingly, when carrier frequency offset is large between a transmit side and a receiver side, an output of a correlator is decreased, and thus, the decision of a symbol timing would be difficult under multi-path and/or large noise environment.

SUMMARY OF THE INVENTION

It is an object, therefore, of the present invention to overcome the disadvantages and limitations of a prior OFDM packet communication receiver system by providing a new and improved OFDM packet communication receiver system.

It is also an object of the present invention to provide an OFDM packet communication receiver system which provide accurate reference received timing even under large carrier frequency offset environment between a transmit side and a receiver side, and/or multi-path propagation environment, and/or thermal noise environment.

The above and other objects are attained by an OFDM packet communication receiver system which receives at least a preamble for synchronization having a plurality of repetitive known short preambles followed by at least one OFDM signal having a guard interval followed by a data signal modulated with multi-carrier modulation comprising; a carrier frequency offset compensation means for compensating carrier frequency offset between a transmit side and a receiver side by using said preamble for synchronization; symbol timing detection means for determining a reference timing of said preamble for synchronization; guard interval removal means for removing a guard interval of an OFDM signal by using the determined reference timing; Fourier Transform means for Fourier transformation of a data signal which is obtained by removing a guard interval from an OFDM signal to provide a received vector of a sub-carrier; sub-carrier demodulation means for coherent detection of a sub-carrier obtained in said Fourier transform means; code decision means for deciding a code carried in a demodulated sub-carrier; wherein said symbol timing detection means comprises; a correlator for providing a correlation between said short preamble and a known pattern in a vector form; a correlation output filter for filter process of an output of said correlator to remove noise, and conversion of a signal into scalar form; a timing decision means for determining said reference timing which indicated end of said preamble for synchronization by comparing an output of said correlation output filter related to said short preamble with a predetermined threshold level.

Preferably, said correlation output filter comprises; a complex filter having an impulse response in every repetition periods of said short preamble; a scalar conversion means for converting an output of said complex filter into scalar form; and a scalar filter for integrating an output of said scalar conversion means for a predetermined time.

Preferably, said correlation output filter comprises; a complex filter having an impulse response in every repetition periods of said short preamble; and a scalar conversion means for converting an output of said complex filter into scalar form.

Preferably, said correlation output filter comprises; a scalar conversion means for converting an output of said correlator into scalar form; and a scalar filter for integrating an output of said scalar conversion means for a predetermined time.

Preferably, said timing decision means comprises; first detection means for detecting that an output of said correlator exceeds a predetermined threshold level a plurality of times in every repetition periods of said short preamble; and second detection means for detecting, after first detection by said first detection means, that an output of said correlator after one repetition period of said first detection decreases more than a predetermined ratio as compared with a level of said first detection.

Preferably, said timing decision means comprises; first detection means for detecting that an output of said correlator exceeds a first threshold level a plurality of times in every repetition periods of said short preamble; and second detection means for detecting that an output of said correlator decreases lower than a second threshold level after one repetition period of a first detection by said first detection means.

Preferably, said timing decision means comprises; first detection means for detecting that an output of said correlator exceeds a first threshold level a plurality of times in every repetition periods of said short preamble; second detection means for detecting, after first detection by said first detection means, that an output of said correlator after one repetition period of said first detection decreases more than a predetermined ratio as compared with a level of said first detection; third detection means for detecting that an output of a second correlator which detects a second preamble; and means for confirming that said second detection means and said third detection means provide detection outputs simultaneously.

Preferably, said timing decision means comprises; first detection means for detecting that an output of said correlator exceeds a first threshold level a plurality of times in every repetition periods of said short preamble; second detection means for detecting, after first detection by said first detection means, that an output of said correlator after one repetition period of said first detection is lower than a second threshold level; third detection means for detecting that an output of a second correlator which detects a second preamble exceeds a third threshold; and means for confirming that said second detection means and said third detection means provide detection outputs simultaneously.

Preferably, said frequency offset compensation means comprises; means for compensating carrier frequency offset between a repetition period of a short preamble between a transmit side and a receiver side upon each receipt of said short preamble; hold means for holding carrier frequency offset relating to a predetermined short preamble; and means for carrying out frequency offset compensation according to a content of said hold means during reception of an OFDM signal after a preamble for synchronization, so that frequency compensated signal by said frequency offset compensation means is applied to said timing detection means.

Preferably, said frequency offset compensation means comprises; delay means for delaying a received signal for a predetermined time; complex multiplier for providing conjugate complex multiplication of said received signal and an output of said delay means; a moving average circuit for providing moving average of an output of said complex multiplier; an inverse tangent circuit for providing phase value of an output of said moving average circuit; a hold circuit receiving an output of said inverse tangent circuit, and having a control input for switching an output of said hold circuit between a first operation phase that said output of said hold circuit is the same as the input to said hold circuit and a second operation phase that said output of said hold circuit is a content of said hold circuit which holds an input signal of said hold circuit at a predetermined time; a phase compensation calculate circuit for integrating an output of said hold circuit for generating compensation value of phase rotation caused by carrier frequency offset ; and a compensation circuit for complex multiplication of said received signal and an output of said phase compensation calculate circuit to compensate carrier frequency offset in said received signal; and said timing decision means comprises supply means for supplying switching signal to said control input of said hold circuit; said supply means makes said hold circuit output an input to the hold circuit as it is when the receiver system is waiting or receiving a preamble for synchronization, and makes said hold circuit output a content of said hold circuit which holds an output of said inverse tangent circuit at the time of the last short preamble when the receiver system is receiving an OFDM signal after preamble for synchronization.

Still preferably, an input of said timing detection means is supplied by an output of said frequency offset compensation means.

BRIEF DESCRIPTION OF THE DRAWINGS

The foregoing and other objects, features, and attendant advantages of the present invention will be understood by means of the following description and accompanying drawings wherein;

FIG. 9 is still another modification of a timing decision circuit 3,

FIG. 10 is a block diagram of a frequency offset compensation circuit 20,

DESCRIPTION OF THE PREFERRED EMBODIMENTS

Figure 1:
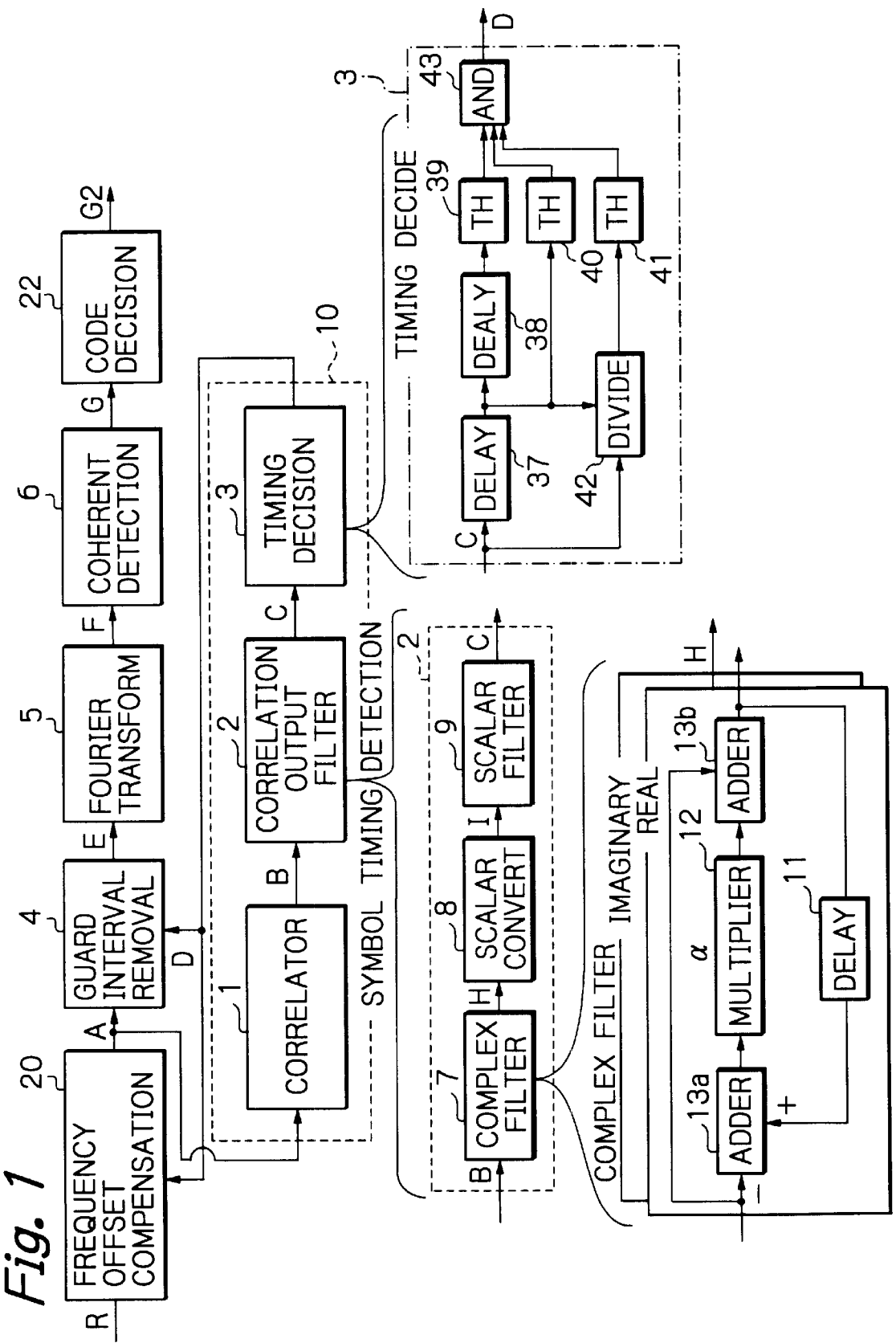
FIG. 1 is a block diagram of an OFDM packet communication receiver system according to the present invention.

FIG. 1 is a block diagram of an OFDM packet communication receiver system according to the present invention. As shown in FIG. 1, the present receiver system has a frequency offset compensation circuit 20 which receives a radio packet signal R having a preamble for synchronization having a plurality of repetition signals with known signal pattern, followed by modulated data signal, for compensating offset of a receiver carrier frequency, a symbol timing detection block 10 for deciding a symbol timing or a reference timing by measuring a preamble for synchronization in a received signal, a guard interval removal circuit 4 for removing a guard interval to provide an OFDM signal according to a symbol timing D measured by said symbol timing detection block, a Fourier transform circuit 5 for Fourier transformation of an OFDM signal supplied by said guard interval removal circuit 4 to provide a received vector for each sub-carriers, a sub-carrier demodulation circuit 6 for coherent detection of said received vector of each sub-carriers provided by said Fourier transform circuit 5, and a code decision circuit 22 for providing decided code G2 (1 or 0) of a demodulated signal.

The symbol timing detection block 10 comprises a correlator 1 for providing correlation value between a received signal and a known signal (short preamble) of a preamble for synchronization, a correlation output filter 2 for extracting an output of the correlator 1 having a repetition period equal to said known pattern or short preamble when a preamble for synchronization is received, and a timing decision circuit 3 receiving an output of said correlation output filter 2 for deciding a symbol timing or a reference timing by deciding an end timing of a preamble for synchronization.

The correlation output filter 2 comprises a complex filter 7 having an impulse response with an interval equal to repetition period of a preamble for synchronization, a scalar convert circuit 8 for converting an output of the complex filter 7 to a scalar signal (not a vector signal), and a scalar filter 9 for integrating the converted scalar signal for a predetermined duration.

Figure 11A:
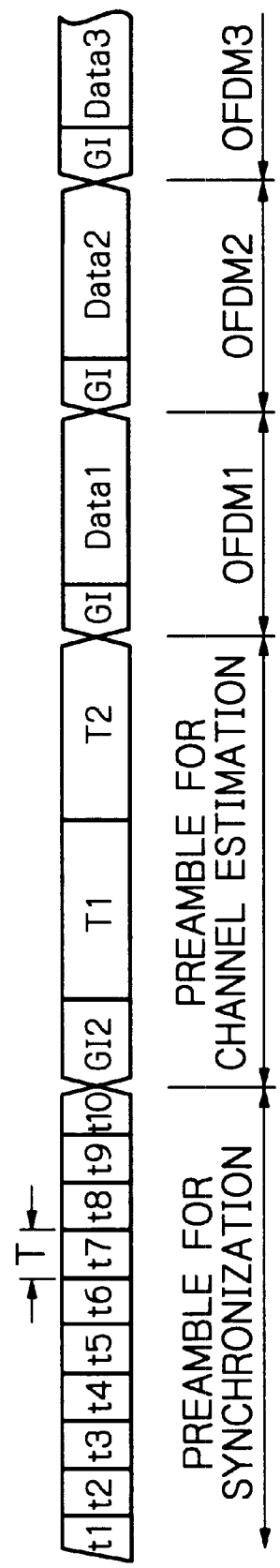
FIG. 11A shows a format of an OFDM packet.
Figure 11B:
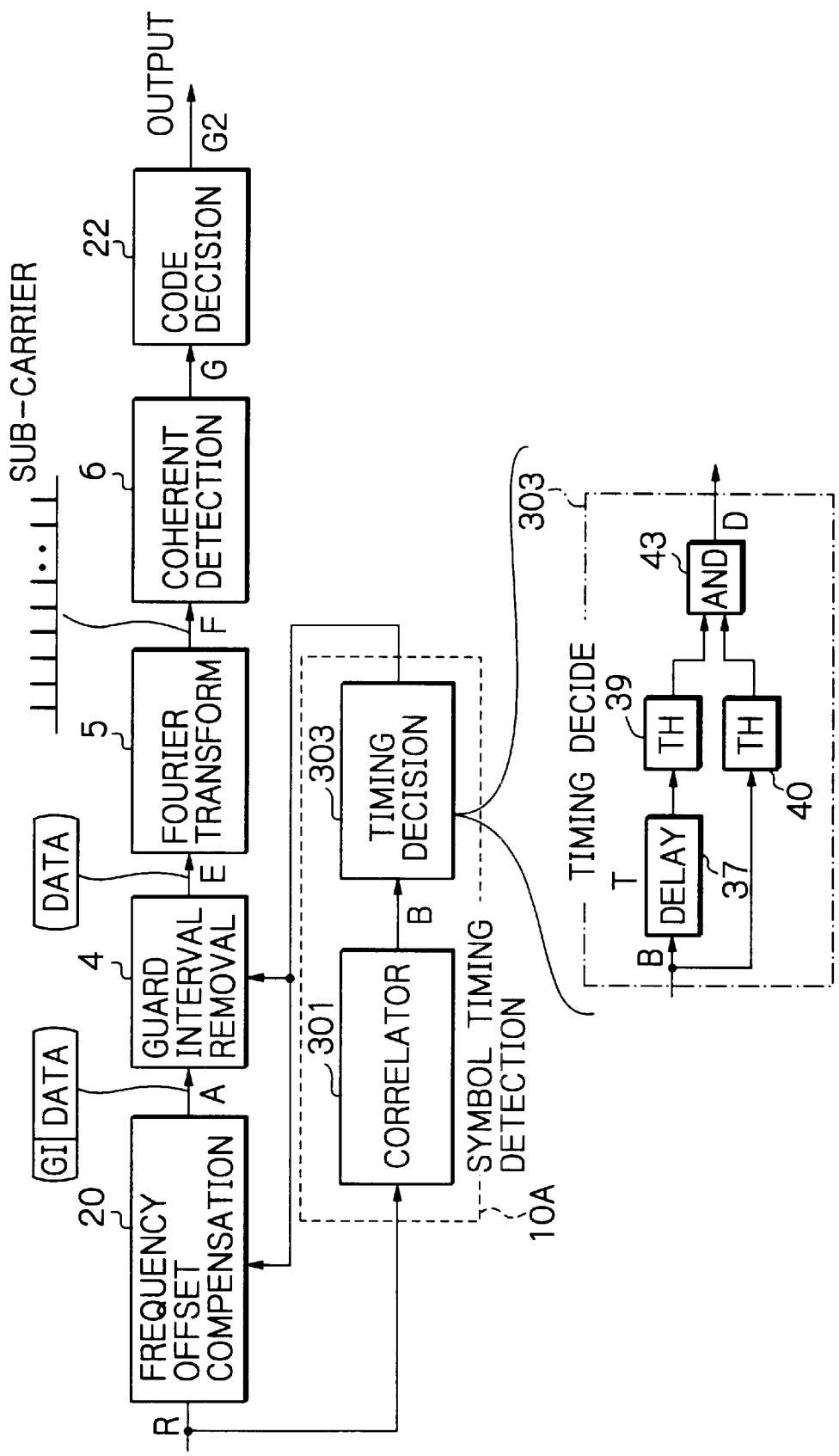
FIG. 11B is a block diagram of a prior OFDM packet communication receiver system.

A received signal R in FIG. 1 is a radio packet signal in a format of FIG. 11A, having a preamble for synchronization with a plurality of known repetition signals followed by a modulated data signal. The received signal R is, upon compensation of carrier frequency offset, applied to a correlator 1, which has coefficient of a known pattern in a preamble for synchronization at the head of a received signal so that a correlation output signal B is provided when a known pattern in a preamble for synchronization is applied. Thus, a correlation output B of the correlator 1 is high with a period equal to a period of a known pattern when a preamble for synchronization is received, and said correlation output B is low when other signal is received.

The correlation output signal B is applied to a correlation output filter circuit 2, which extracts repetition signals as a correlation output B upon receipt of a preamble for synchronization, and decreases noise component due to thermal noise and/or interference. An output C of the correlation output filter circuit 2 has improved signal-to-noise ratio, and is applied to a timing decision circuit 3, which recognizes the presence of a preamble for synchronization when an output C of the correlation output filter 2 exceeds a threshold level, and then recognizes the decrease of said output C of the correlation output filter 2, so that an end of a preamble for synchronization is decided and a symbol timing signal D is generated.

Thus, the symbol timing detection block 10 comprises the correlator 1, the correlation output filter 2 and the timing decision circuit 3. The symbol timing signal D is applied to the guard interval removal circuit 4, which provides an OFDM signal E for each OFDM symbol by removing a guard interval in an output of the frequency offset compensation circuit 20 which compensates frequency offset in a received signal R. A guard interval GI at the head of an OFDM signal has a signal of cyclic extension signal of an OFDM symbol, and is deleted by the guard interval removal circuit 4. The OFDM signal E obtained by the guard interval removal circuit 4 is applied to a Fourier transform circuit 5, which converts an input signal to sub-carrier vector signal F of each sub-carriers. The sub-carrier vector signal F is applied to a sub-carrier demodulator 6, which carries out coherent detection of each sub-carrier signals to provide detected signal G. Then, a code decision circuit 22 decides a code (1 or 0) of the detected signal G to provide the decided signal G2 (1 or 0).

A complex filter 7 has a real component and an imaginary component, each of which is constituted by a primary IIR filter. An IIR filter has a feed back loop including a delay circuit 11 with delay time T for filter process of a signal having period T.

Figure 2:
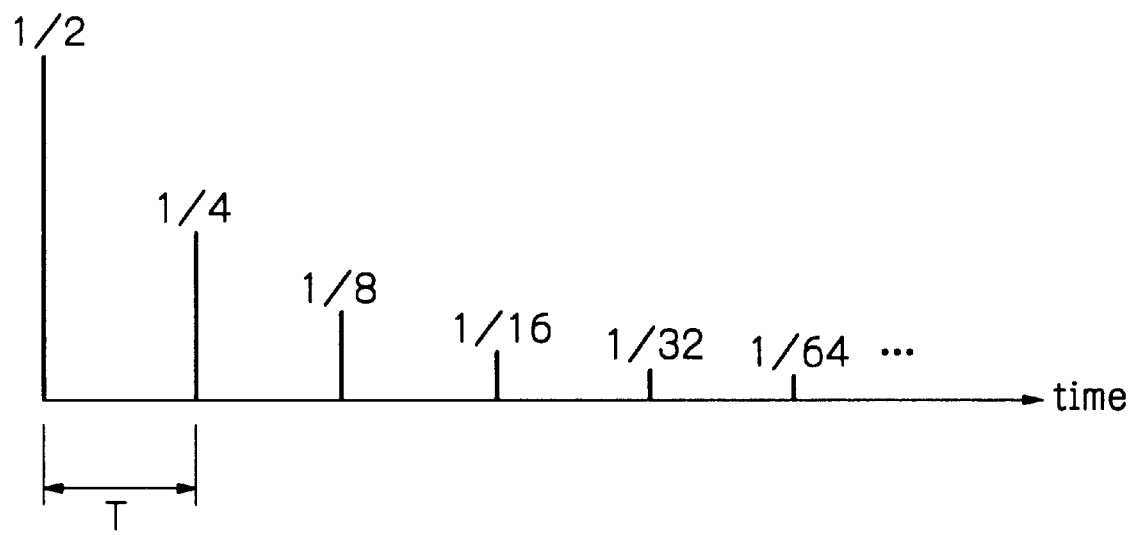
FIG. 2 shows an impulse response of a complex filter when a constant ($\alpha$) of a constant multiplier is 0.5.

For instance, when a constant ($\alpha$) of a constant multiplier 12 is 0.5, an impulse response of a complex filter has long decreasing response in every period T as shown in FIG. 2. It should be appreciated that the delay time T is the same as repetition period (=t1=t2 - - - =t10) of a preamble for synchronization (short preamble). Since phase variation of a repetitive output having a period T of the correlator can be neglected within duration of a preamble for synchronization, the complex filter combines outputs of the correlator so that an output level of the correlator is increased. On the other hand, as noise superimposed on a received signal R has no correlation with a preamble signal, the complex filter decreases noise component in an output of the correlator. In particular, as phase of noise component in an output of the correlator is distributed uniformly, noise component is much decreased by the use of the complex filter.

A received signal in a radio communication system is a combination of a plurality of signals due to multi-path propagation. In an OFDM communication system, the symbol timing detection block must detect the symbol timing accurately even when many multi-path delay waves having high level exist, in order to emphasize the feature of the OFDM system which operates correctly in spite of multi-path propagation.

Figure 3:
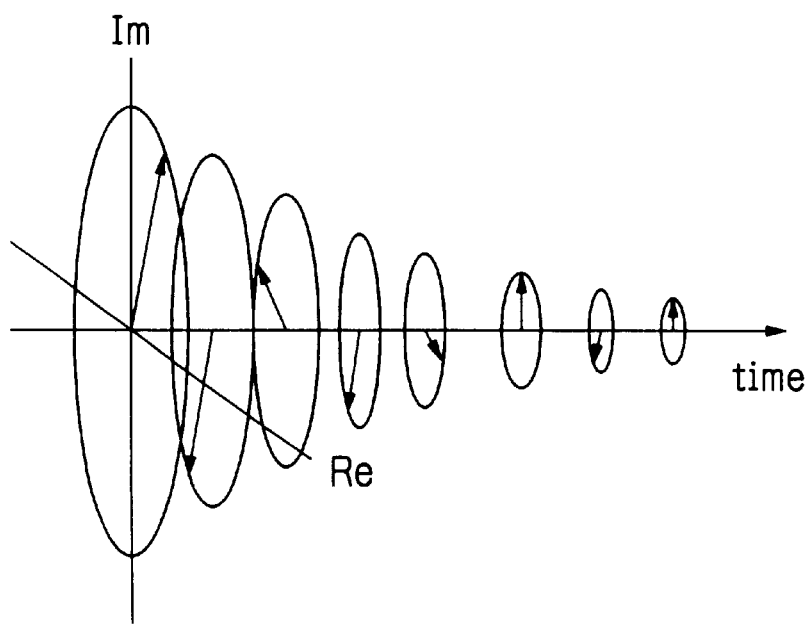
FIG. 3 shows an example of impulse response characteristics of a multi-path propagation.

FIG. 3 shows an example of impulse response in multi-path propagation, in which Re shows a real part, and Im shows an imaginary part. Considering a indoor communication, statistically speaking, a signal having short delay has high level, and the longer the delay is, the lower a signal level is. As a received signal is a combination of a plurality of propagation paths, a received level having each delay is modeled by Reyleigh distribution, and phase has uniform distribution.

As mentioned above, a received signal through multi-path propagation is a combination of multi-path waves distributed on time axis, and the phase of the received signal has uniform distribution. When we consider only a single received signal, a correlation output signal upon receipt of a preamble for synchronization has a repetition of impulses having a period equal to a repetition of a preamble for synchronization. On the other hand, when we consider a multi-path received signal, a correlation output signal upon receipt of a preamble for synchronization has a repetition of impulses of multi-path propagation. When we integrate correlation output signals which distribute on time axis, signal-to-noise ratio of the correlation output signal is improved. As a phase of multi-path waves distributed on time axis is independent from one another, the integration must be carried out after the correlation output complex signal is converted into scalar form. A scalar convert circuit 8 converts complex filter output signal H to correlation scalar signal I, which is integrated by a scalar filter 9. Thus, an output C of a correlation output filter is obtained.

Figure 4:
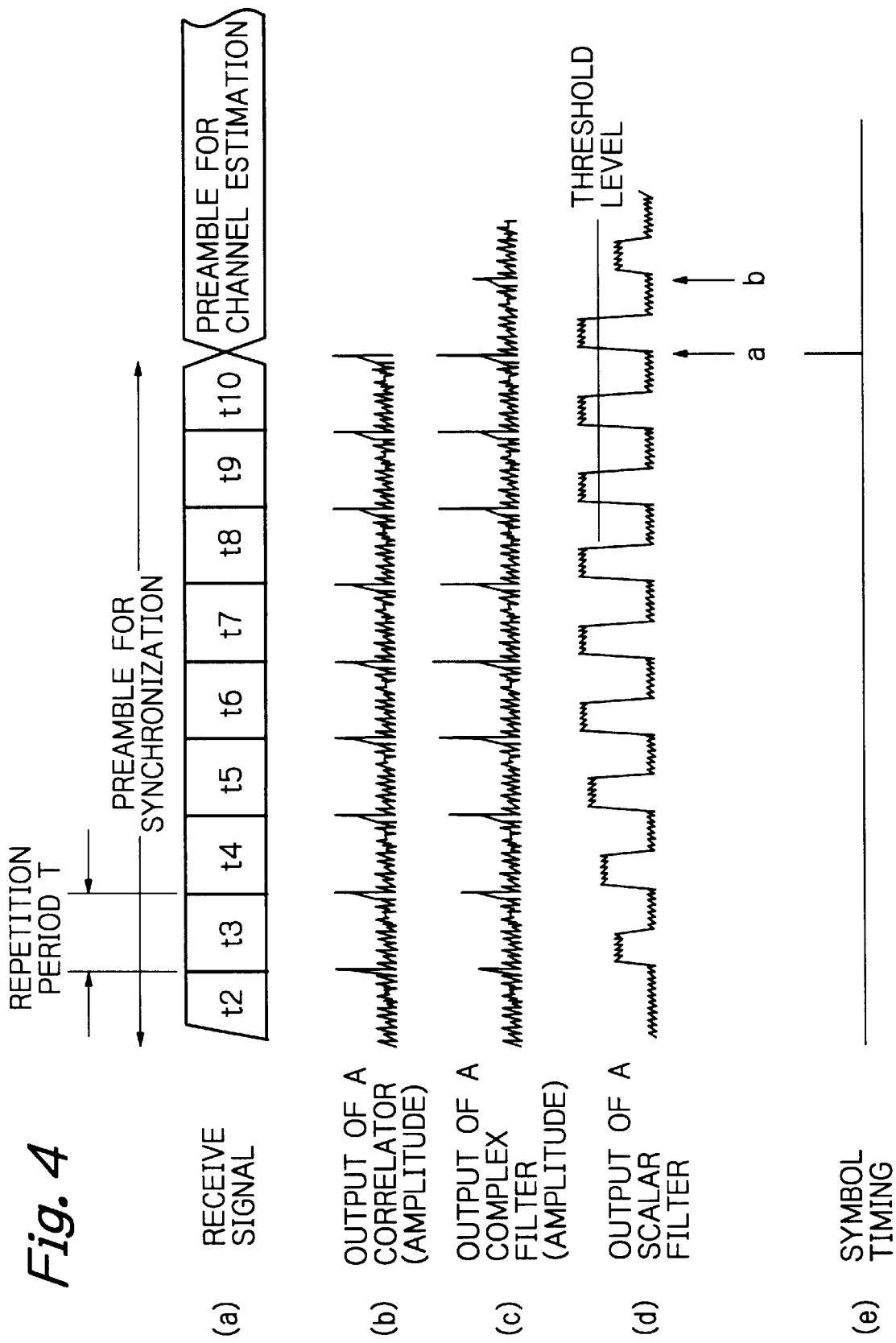
FIG. 4 is an operational model of a symbol timing detection circuit.

The operation of a symbol timing detection block 10 is shown in FIG. 4. As shown in FIG. 4($a$), it is assumed that a radio packet signal has a preamble for synchronization having 10 repetitive known pattern signals (short preamble) t1 through t10. The period of the repetition of the known pattern of the preamble for synchronization is T. When the signal of FIG. 4($a$) is received, a correlator recognizes the known pattern of a preamble for synchronization, and provides repetitive impulse outputs in every repetitive periods as shown in FIG. 4($b$). It is assumed in FIG. 4($b$) that no multi-path delay wave exist for the sake of simplicity of a drawing.

When a correlator output is applied to a complex filter 7, the complex filter provides a complex filter output as shown in FIG. 4($c$). It is assumed in FIG. 4($c$) that a complex filter has an impulse response as shown in FIG. 2. The complex filter output is converted into scalar form, and is applied to a scalar filer 9 which provides an output as shown in FIG. 4($d$). FIG. 4($d$) shows an example when a scalar filter is a moving average filter having time length equal to half period (T/2) of repetition period T. Then, a scalar filter output is applied to a timing decision circuit 3 as an output of a correlation output filter. The timing decision circuit 3 recognizes the timing (a) as the end of a preamble for synchronization, by measuring that a scalar filter output exceeds a threshold at a timing (a) of FIG. 4($d$) and said output decreases at a timing (b) after time T of the timing (a). Thus, the symbol timing is decided to be at the timing (a) as shown in FIG. 4($e$).

As mentioned above, since decreasing outputs (FIG. 2) of a correlation filter have the same phase in each repetitive periods, said outputs are processed by using a complex filter which has large effect for decreasing noise component. Further, since phase of delayed waves due to multi-path propagation has no correlation (at random), the received signals are converted into scalar form and are integrated by a scalar filter. Thus, it should be appreciated that signal-to-noise ratio of a correlation output is improved by filter processes (complex filter and/or scalar filter) considering characteristics of a correlation output signal.

Figure 5:
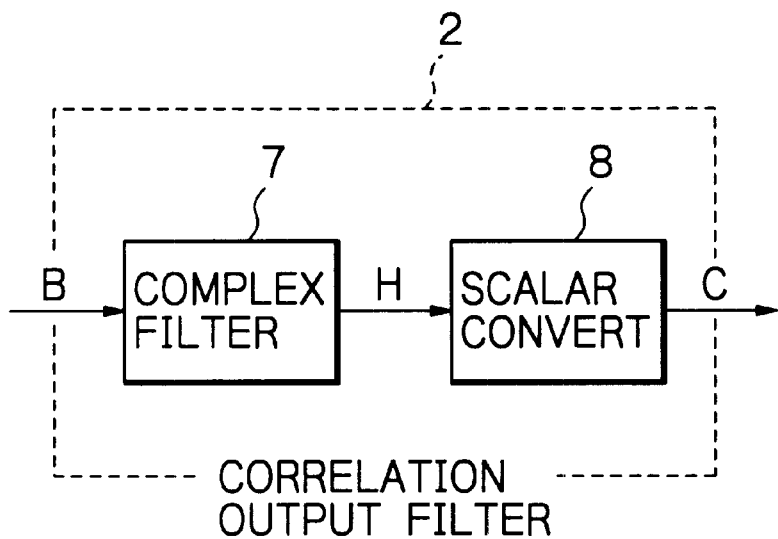
FIG. 5 is a modification of a correlation output filter circuit 2.

FIG. 5 shows a modification of a correlation output filter 2. The correlation output filter shown in FIG. 5 lacks a scalar filter 9 shown in FIG. 1.

Figure 6:
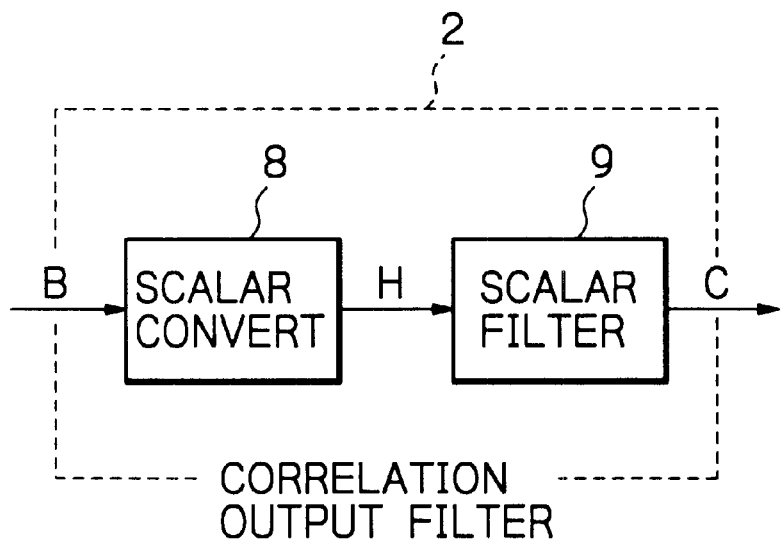
FIG. 6 is another modification of a correlation output filter 2.

FIG. 6 shows another modification of a correlation output filter 2. The correlation output filter shown in FIG. 6 lacks a complex filter 7 shown in FIG. 1. Although FIG. 5 and FIG. 6 are simple, they can detect a symbol timing accurately as compared with a prior art.

Now, a timing decision circuit 3 is described. A timing decision circuit 3 in FIG. 1 detects the presence of a preamble for synchronization by detecting two consecutive known patterns in the preamble for synchronization. In an actual system, as there are ten short preambles in the preamble for synchronization, the last two short preambles are to be detected. An output C of a correlation output filter is applied to a threshold circuit 40 through a delay circuit 37, and an output of the delay circuit 37 is further applied to another threshold circuit 39 through another delay circuit 38. The delay time T of the delay circuits 37 and 38 is the same as the repetition period of a known pattern (short preamble) in a preamble for synchronization. Thus, the threshold circuit 39 receives a correlation output at the past by time 2T, and the threshold circuit 40 receives a correlation output at the past by time T so that the threshold circuits 39 and 40 detect that a short preamble existed at the past by time 2T and time T, respectively, by detecting that an input signal to the threshold circuits exceeds a threshold level. The correlation output C is further applied to a divide circuit 42, which divides the correlation filter output C by an output of the delay circuit 37 or the correlation filter output at the past by time T. A quotient or an output of the divider is applied to still another threshold circuit 41, which detects that the current correlation output decreases by a predetermined ratio as compared with that at the past by time T. Preferably, the decrease by a predetermined ratio is the decrease in the range between 60 % and 80 %, and still preferably, it is 70 %. An output of the threshold circuits 39, 40 and 41 are applied to a logic circuit 43 which is implemented by an AND circuit. The logic circuit 43 determines the end of a preamble for synchronization, when the correlation output at the past by time 2T and the correlation output at the past by time T exceed a threshold level so that the presence of a short preamble is indicated, and when the current correlation output decreases by a predetermined ratio as compared with that at the past by time T.

Figure 7:
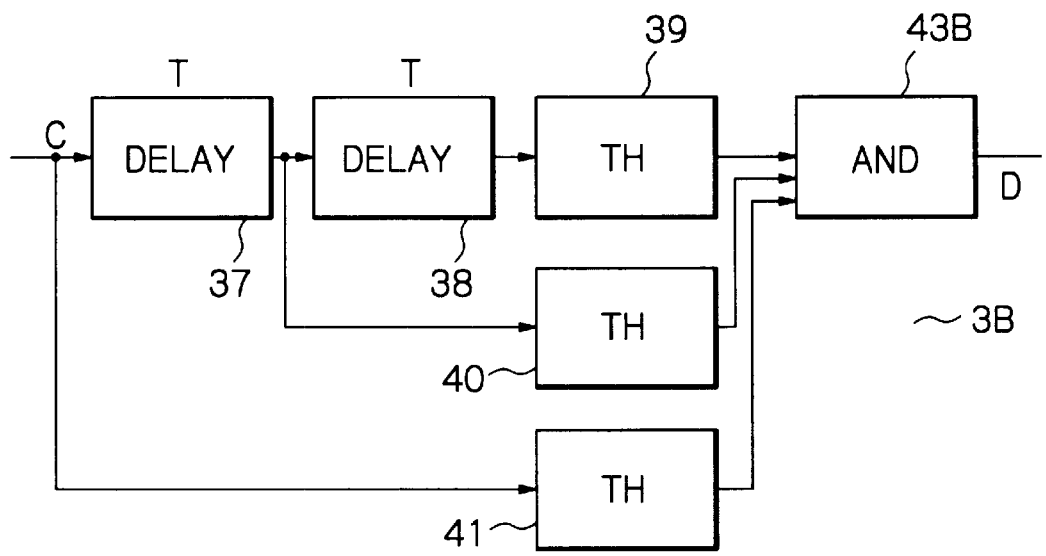
FIG. 7 is a modification of a timing decision circuit 3

FIG. 7 shows a modification 3B of a timing decision circuit 3.

In the modification in FIG. 7, a logic circuit 43B recognizes first the presence of a preamble for synchronization when an output of a correlation output filter exceeds a first threshold level (threshold circuits 39 and 40) a plurality of times for every repetition periods, and secondly, that, after the repetition period, an output of said correlation output filter decreases lower than a second threshold level (threshold circuit 41).

The feature of the timing decision circuit in FIG. 7 is that the end of a preamble for synchronization is determined when an output of a correlation output filter decreases lower than a threshold level. FIG. 7 shows an example that a preamble for synchronization is detected by detecting a known pattern (short preamble) during two periods. An output C of a correlation output filter is applied to a threshold circuit 40 through a delay circuit 37, and an output of the delay circuit 37 is applied to a threshold circuit 39 through a delay circuit 38. The delay time of the delay circuits 37 and 38 is equal to repetition period T of a known pattern (short preamble) of a preamble for synchronization. Therefore, the threshold circuit 39 receives a correlation output at the past by 2T, and the threshold circuit 40 receives a correlation output at the past by T. The threshold circuits 39 and 40 detect that a short preamble existed at the past by 2T and T, respectively, when an input signal exceeds a threshold level. An output of the correlation output filter is further applied to a threshold circuit 41, which detects that the current output of the correlation output filter is less than a threshold level, or no preamble for synchronization exists.

The structure of FIG. 7 is advantageous that it is simple in structure as it has no divide circuit.

Figure 8:
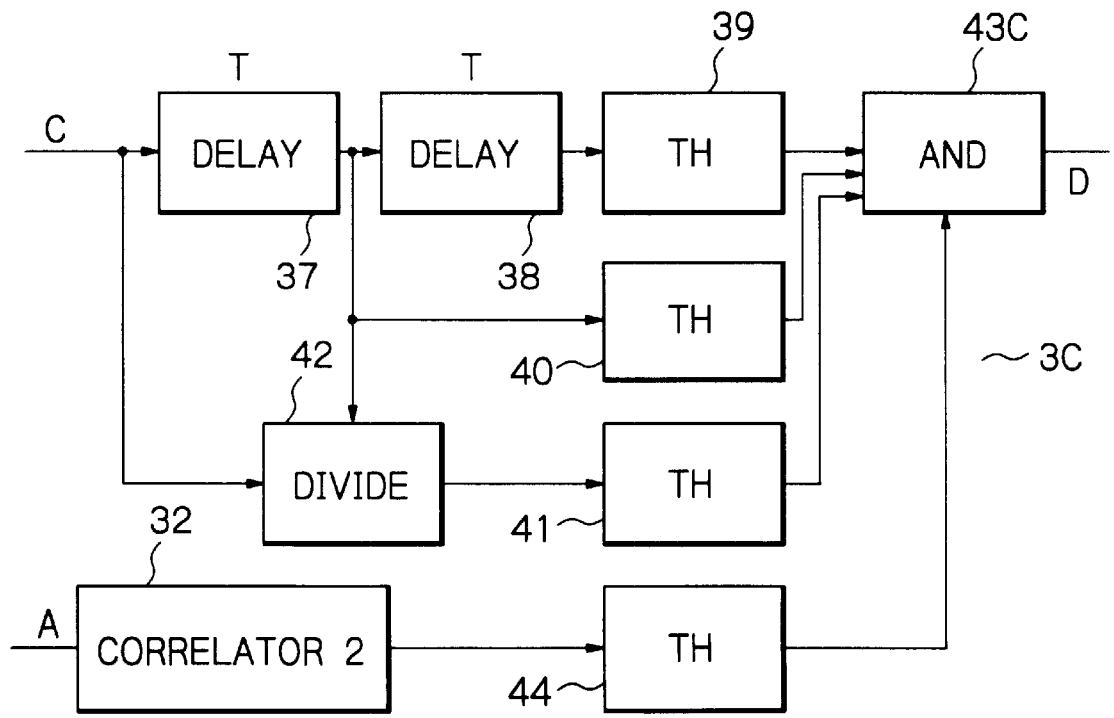
FIG. 8 is another modification of a timing decision circuit 3.

FIG. 8 shows another modification 3C of a timing decision circuit 3.

It is assumed in FIG. 8 that a second known pattern is transmitted, following a first known pattern (short preamble). For instance, the pattern of the last short preamble t10 in FIG. 11A differs from the pattern of other short preambles t1 through t9 so that t10 is used as a second known pattern, alternatively, a preamble for channel estimation can be used as a second known pattern. As the second pattern differs from the first pattern, those patterns can be distinguished. A correlator 32 detects the second known pattern.

The timing decision circuit 3C in FIG. 8 has a logic circuit 43C for detecting the end of a preamble for synchronization. The logic circuit 43C detects the presence of a preamble for synchronization when an output of a correlation output filter exceeds a first threshold level a plurality of times for every repetition periods, then, detects that a correlation output decreases a predetermined ratio as compared with a correlation output at the past by a repetition period T of a first short preamble, and finally, detects that an output of the second correlator 32 exceeds a second threshold level (threshold circuit 44).

A correlation output C is applied to a threshold circuit 40 through a delay circuit 37, and an output of the delay circuit 37 is applied to a threshold circuit 39 through a delay circuit 38. The delay time T of the delay circuits 37 and 38 is the same as the repetition period T of a known pattern or a short preamble.

Thus, the threshold circuit 39 receives a correlation output at the past by 2T, and the threshold circuit 40 receives a correlation output at the past by T. The threshold circuits 39 and 40 determines the presence of a known pattern or a short preamble at the past by 2T and T, respectively, when an input signal exceeds a threshold level. A correlation output is further applied to a divide circuit 42, which divides a correlation output C by an output of the delay circuit 37 or a correlator output at the past by T. A quotient or an output of the divide circuit 42 is applied to a threshold circuit 41, which detects that the current correlator output decreases a predetermined ratio as compared with the correlator output at the past by T.

Simultaneously, an output A of the frequency offset compensation circuit 20 is applied to a second correlator 32, which detects a second known pattern (second short preamble) which is transmitted following a first known pattern (first short preamble). An output of the second correlator 32 is applied to a threshold circuit 44, which detects the second short preamble through the comparison of the input signal with a threshold level. An output of the threshold circuits 39, 40, 41 and 44 is applied to a logic circuit 43C, which detects the end of the first preamble when the presence of a first short preamble is confirmed by correlator outputs at the past by 2T and T exceeding a threshold, the current correlator output decreases more than a predetermined ratio as compared with the correlator output at the past by T, and a second short preamble which follows a first preamble is detected.

FIG. 9 is still another modification 3D of a timing decision circuit 3.

It is assumed in FIG. 9 as is the case of FIG. 8 that a second known pattern in a preamble is transmitted following a first known pattern. As a second known pattern differs from a first known pattern, these patterns can be distinguished. A correlator 32 in FIG. 9 detects a second known pattern.

The timing decision circuit 3D in FIG. 9 has a logic circuit 43D for detecting the end of a first short preamble. The logic circuit 43D detects the presence of a first short preamble by detecting that a correlator output exceeds a first threshold level (threshold circuits 39 and 40) a plurality of times for every repetition periods of a first short preamble, that the correlator output decreases lower than a second threshold level (threshold circuit 41) after repetition period of a first short preamble, and that an output of the correlator 32 exceeds a third threshold level (threshold circuit 44).

The embodiment of FIG. 9 differs from that of FIG. 8 in that the end of a first short preamble is detected when a correlator output is decreased lower than a threshold level.

A correlator output C is applied to a threshold circuit 40 through a delay circuit 37. An output of the delay circuit 37 is applied to a threshold circuit 39 through a delay circuit 38. The delay time T of the delay circuits 37 and 38 is the same as the repetition period of a first preamble. Thus, the threshold circuit 39 receives a correlation output at the past by 2T, and the threshold circuit 40 receives a correlation output at the past by T.

The threshold circuits 39 and 40 detect that a correlator output exceeded at the past by 2T and T, respectively, by detecting that an input signal to a respective threshold circuit exceeded a threshold level. A correlator output C is further applied to a threshold circuit 41, which detects that the current correlator output is less than a threshold level or no first short preamble exists.

Simultaneously, an output A of the frequency offset compensation circuit 20 is applied to a correlator 32, which detects a second short preamble. An output of the correlator 32 is applied to a threshold circuit 44, which compares an input signal with a threshold level in order to detect the presence of the second short preamble following first short preambles.

An output of the threshold circuits 39, 40, 41 and 44 is applied to a logic circuit 43D which detects the end of the preamble for synchronization by detecting that correlator outputs at the past by 2T and T exceed a threshold level showing the presence of a first short preamble, the current correlator output is lower than a threshold, and that a second short preamble is detected following a first short preamble.

The structure of FIG. 9 is simplified as compared with that of FIG. 8, as FIG. 9 has no divider circuit 42.

FIG. 10 is a block diagram of a frequency offset compensation circuit 20 in FIG. 1.

A frequency offset compensation circuit 20 compensates carrier frequency offset between short preamble wave forms between a transmit side and a receiver side continuously when a preamble for synchronization is received. When a data signal is received until the end of a packet after a timing decision circuit 3 detects a preamble for synchronization, the frequency offset compensation circuit 20 compensates carrier frequency offset according to the carrier frequency offset measured when the preamble for synchronization is detected.

As shown in FIG. 10, the carrier frequency offset compensation circuit 20 comprises a delay circuit 201 for delaying a received signal by a predetermined time T equal to a period of a short preamble, a complex multiplier 202 for conjugate complex multiplication of a received signal R and an output of said delay circuit 201, a moving average circuit 203 for providing a moving average of an output of said multiplier 202, an inverse tangent circuit 204 for providing phase of an output of the moving average circuit 203, a hold circuit 205 having a control input which switches the hold circuit 205 between a first operation phase that an output of the hold circuit 205 is the same as a current input of the hold circuit and a second operation phase that an output of the hold circuit is latched to an input signal at the time of a predetermined short preamble, a phase compensation calculate circuit 206 for integrating an output of the hold circuit 205 for generating compensation of phase rotation caused by carrier frequency offset , and a compensation circuit 207 for compensating carrier frequency offset of a received signal R through complex multiplication of the received signal R and an output of said phase compensation calculate circuit 206.

An output of the timing decision circuit 3 in FIG. 1 is applied to the control input of the hold circuit 205 as a switching control signal. When the receiver system waits for a preamble for synchronization or is receiving a preamble for synchronization, the control signal makes the hold circuit 205 output an input signal into the hold circuit as it is, and when the receiver system has detected a preamble for synchronization or is receiving an OFDM signal, the control signal makes the hold circuit 205 output a latched signal when the preamble for synchronization is detected.

A received signal R is applied to the complex multiplier 202, the delay circuit 201, and the compensation circuit 207 in FIG. 10. The delay circuit 201 delays an input signal by the time T which is equal to a repetition period of a short preamble of a preamble for synchronization. An output 2B of the delay circuit 201 is applied to the complex multiplier 202, which carries out conjugate complex multiplication of a received signal R and an output 2B of the delay circuit 201.

An output 2C of the complex multiplier 202 is applied to the moving average circuit 203 which carries out the moving average of phase rotation vector provided by the complex multiplier 202, caused by carrier frequency offset. An output 2D of the moving average circuit 203 is applied to the inverse tangent circuit 204, which converts the complex vector of an output of the moving average circuit 203 into phase value. An output 2E of the inverse tangent circuit 204, or phase rotation between a short preamble caused by carrier frequency offset is applied to the hold circuit 205, which provides either an input signal which is an output of the inverse tangent circuit 204 as it is, or a latched output signal at a predetermined time, according to the control input signal.

The control input of the hold circuit 205 receives an output of the timing decision circuit 3 indicating the presence of a preamble for synchronization. The hold circuit 205 provides either an output signal which is the same as an input signal of the hold circuit 205 when the receiver system is receiving a preamble for synchronization, or an output signal of the hold circuit 205 or carrier frequency offset at the time of the detection of the preamble for synchronization, when the receiver system is receiving a data signal following the preamble for synchronization.

An output 2F of the hold circuit 205 is applied to the phase compensation calculate circuit 206. An input to the phase compensation calculate circuit 206 is phase rotation during repetition period of a short preamble caused by carrier frequency offset. By using the input signal, the phase compensation calculate circuit 206 calculates the phase rotation for every sample of the OFDM signal, and generates opposite phase rotation through integration process for compensating the phase rotation of a received signal R caused by carrier frequency offset.

An output 2G of the phase compensation calculate circuit 206 is applied to the compensation circuit 207, which compensates phase rotation of a received signal R according to an output of the phase compensation calculate circuit 206, and provides a compensated signal A which is free from carrier frequency offset.

As described above, according to the present invention, a preamble for synchronization is detected finely, or a reference timing or a symbol timing is detected finely even under environment of large waveform distortion due to thermal noise and/or multi-path propagation.

The present invention determines the reference timing finely even when carrier frequency offset is large between a transmit side and a receiver side, under multi-path propagation and/or thermal noise environment.

From the foregoing, it will now be apparent that a new and improved OFDM packet communication receiver system has been found. It should be understood of course that the embodiments disclosed are merely illustrative and are not intended to limit the scope of the invention. Reference should be made to the appended claims, therefore, for indicating the scope of the invention.

What is claimed is:

1. An OFDM packet communication receiver system which receives at least a preamble for synchronization having a plurality of repetitive known short preambles followed by at least one OFDM signal having a guard interval followed by a data signal modulated with multi-carrier modulation comprising;
    a carrier frequency offset compensation means for compensating carrier frequency offset between a transmit side and a receiver side by using said preamble for synchronization,
    symbol timing detection means for determining a reference timing of said preamble for synchronization,
    guard interval removal means for removing a guard interval of an OFDM signal by using the determined reference timing,
    Fourier Transform means for Fourier transformation of a data signal which is obtained by removing a guard interval from an OFDM signal to provide a received vector of a sub-carrier,
    sub-carrier demodulation means for coherent detection of a sub-carrier obtained in said Fourier transform means, and
    code decision means for deciding a code carried in a demodulated sub-carrier,
CHARACTERIZED IN THAT
    said symbol timing detection means comprises;
    a correlator for providing a correlation between said short preamble and a known pattern in a vector form,
    a correlation output filter for filter process of an output of said correlator to remove noise, and conversion of a signal into scalar form,
    a timing decision means for determining said reference timing which indicated end of said preamble for synchronization by comparing an output of said correlation output filter related to said short preamble with a predetermined threshold level.

2. An OFDM packet communication receiver system according to claim 1, wherein said correlation output filter comprises;
    a complex filter having an impulse response in every repetition periods of said short preamble,
    a scalar conversion means for converting an output of said complex filter into scalar form, and
    a scalar filter for integrating an output of said scalar conversion means for a predetermined time.

3. An OFDM packet communication receiver system according to claim 1, wherein said correlation output filter comprises;
    a complex filter having an impulse response in every repetition periods of said short preamble, and
    a scalar conversion means for converting an output of said complex filter into scalar form.

4. An OFDM packet communication receiver system according to claim 1, wherein said correlation output filter comprises;
    a scalar conversion means for converting an output of said correlator into scalar form, and
    a scalar filter for integrating an output of said scalar conversion means for a predetermined time.

5. An OFDM packet communication receiver system according to claim 1, wherein said timing decision means comprises;
    first detection means for detecting that an output of said correlator exceeds a predetermined threshold level a plurality of times in every repetition periods of said short preamble, and
    second detection means for detecting, after first detection by said first detection means, that an output of said correlator after one repetition period of said first detection decreases more than a predetermined ratio as compared with a level of said first detection.

6. An OFDM packet communication receiver system according to claim 1, wherein said timing decision means comprises;
    first detection means for detecting that an output of said correlator exceeds a first threshold level a plurality of times in every repetition periods of said short preamble, and
    second detection means for detecting that an output of said correlator decreases lower than a second threshold level after one repetition period of a first detection by said first detection means.

7. An OFDM packet communication receiver system according to claim 1, wherein said timing decision means comprises;
    first detection means for detecting that an output of said correlator exceeds a first threshold level a plurality of times in every repetition periods of said short preamble,
    second detection means for detecting, after first detection by said first detection means, that an output of said correlator after one repetition period of said first detection decreases more than a predetermined ratio as compared with a level of said first detection,
    third detection means for detecting that an output of a second correlator which detects a second preamble, and
    means for confirming that said second detection means and said third detection means provide detection outputs simultaneously.

8. An OFDM packet communication receiver system according to claim 1, wherein said timing decision means comprises;
    first detection means for detecting that an output of said correlator exceeds a first threshold level a plurality of times in every repetition periods of said short preamble,
    second detection means for detecting, after first detection by said first detection means, that an output of said correlator after one repetition period of said first detection is lower than a second threshold level,
    third detection means for detecting that an output of a second correlator which detects a second preamble. exceeds a third threshold, and
    means for confirming that said second detection means and said third detection means provide detection outputs simultaneously.

9. An OFDM packet communication receiver system according to claim 1, wherein said frequency offset compensation means comprises;

means for compensating carrier frequency offset between a repetition period of a short preamble between a transmit side and a receiver side upon each receipt of said short preamble, hold means for holding carrier frequency offset relating to a predetermined short preamble, and means for carrying out frequency offset compensation according to a content of said hold means during reception of an OFDM signal after a preamble for synchronization, so that frequency compensated signal by said frequency offset compensation means is applied to said timing detection means.

10. An OFDM packet communication receiver system according to claim 9, wherein said frequency offset compensation means comprises;

delay means for delaying a received signal for a predetermined time, complex multiplier for providing conjugate complex multiplication of said received signal and an output of said delay means, a moving average circuit for providing moving average of an output of said complex multiplier, an inverse tangent circuit for providing phase value of an output of said moving average circuit, a hold circuit receiving an output of said inverse tangent circuit, and having a control input for switching an output of said hold circuit between a first operation phase that said output of said hold circuit is the same as the input to said hold circuit and a second operation phase that said output of said hold circuit is a content of said hold circuit which holds an input signal of said hold circuit at a predetermined time, a phase compensation calculate circuit for integrating an output of said hold circuit for generating compensation value of phase rotation caused by carrier frequency offset , and a compensation circuit for complex multiplication of said received signal and an output of said phase compensation calculate circuit to compensate carrier frequency offset in said received signal, and said timing decision means comprises supply means for supplying switching signal to said control input of said hold circuit, said supply means makes said hold circuit output an input to the hold circuit as it is when the receiver system is waiting or receiving a preamble for synchronization, and makes said hold circuit output a content of said hold circuit which holds an output of said inverse tangent circuit at the time of the last short preamble when the receiver system is receiving an OFDM signal after preamble for synchronization.

11. An OFDM packet communication receiver system according to claim 1, wherein an input of said timing detection means is supplied by an output of said frequency offset compensation means.

* * * * *